(12) United States Patent
Lee

(10) Patent No.: US 6,867,249 B2
(45) Date of Patent: Mar. 15, 2005

(54) LIGHTWEIGHT AND POROUS CONSTRUCTION MATERIALS CONTAINING RUBBER

(76) Inventor: Kin Man Amazon Lee, Unit 313, 3/F, Tech Centre, 72 Tat Chee Avenue, Kowloon Tong, Hong Kong (CN)

( * ) Notice: Subject to any disclaimer, the term of this patent is extended or adjusted under 35 U.S.C. 154(b) by 132 days.

(21) Appl. No.: 10/317,494

(22) Filed: Dec. 12, 2002

(65) Prior Publication Data

US 2003/0125425 A1 Jul. 3, 2003

Related U.S. Application Data

(63) Continuation-in-part of application No. 09/764,505, filed on Jan. 17, 2001, now abandoned.

(30) Foreign Application Priority Data

Aug. 18, 2000 (GB) .............................................. 0020432

(51) Int. Cl.$^7$ ............................................... C04B 24/24
(52) U.S. Cl. ....................... 524/4; 524/2; 524/3; 524/5; 524/6; 524/7; 524/8
(58) Field of Search .......................................... 524/2–8

(56) References Cited

U.S. PATENT DOCUMENTS 5,290,356 A * 3/1994 Frankowski ................. 106/726
5,456,751 A * 10/1995 Zandi et al. ................. 106/724
6,103,783 A * 8/2000 Hong .......................... 523/206

* cited by examiner

*Primary Examiner*—Peter Szekely
(74) *Attorney, Agent, or Firm*—Alix, Yale & Ristas, LLP

(57) ABSTRACT

The present invention relates to a process for manufacturing a construction material by mixing a cementitious material, rubber bits and water. It also extends to a construction material comprising cured cementitious material and rubber bits in which the rubber bits are bonded together in a porous and permeable matrix by the cementitious material. An elastic binding material improves the physical properties of the construction material. The construction material can be cast in place or formed into blocks for transport to a construction site.

23 Claims, 14 Drawing Sheets

LIGHTWEIGHT AND POROUS CONSTRUCTION MATERIALS CONTAINING RUBBER

CROSS REFERENCE TO RELATED APPLICATIONS

This application is a continuation-in-part of U.S. patent application Ser. No. 09/764,505, filed Jan. 17, 2001, now abandoned.

BACKGROUND OF THE INVENTION

1. Field of the Invention

The present invention relates to construction materials and in particular cementitious construction materials.

Each year about 250 million tires in the USA and about 1,000 million in the world are scrapped. Current trends indicate that less than 7 percent of these tires are being recycled into other products, 11 percent are being burned for energy, and 5 percent are being exported third world countries for reuse. *Scrap Tire Technology and Markets*, US Environmental Protection Agency, Office of Solid Waste, Washington, D.C., 1993, published by Noyes Data Corporation, Park Ridge, N.J.

Over 70 percent of scrap tires end up in overcrowded landfills, and millions more are left in empty lots and illegal tire dumps. These dumps have the potential to cause serious fire and environmental hazards. Because rubber tires do not easily decompose, economically feasible and environmentally sound alternatives for scrap tire disposal must be found.

In recent years, civil (geotechnical) engineering applications of tire shreds, which are pieces of whole tires cut into 50–300 mm pieces, have increased. The use of tire shreds as fill material in geotechnical applications has several potential benefits. In areas where underlying soil is compressible or weak, tire shreds, with their unit weight about one third of the conventional backfill, would apply a smaller overburden stress than conventional granular backfill, resulting in lower settlement and increased overall stability.

Moreover, the horizontal stress induced on retaining structural systems would be about one half lower than conventional backfill, leading to a less expensive retaining structure design.

However, the existing civil engineering applications of tire shreds face a number of technical difficulties. The quality control of the in situ compaction process of tire shreds is subject to many variables and uncertainties. Furthermore, the performance of the compacted tire shreds is highly workmanship dependent. *Tire Chips-A New Road—Building Geomaterial,* Humphrey, D. N., 1996, TR News, Washington, D.C., Vol. 184, No. 17.

Another potential problem of the use of tire shreds as a backfill material is the considerable amount of settlement that may be caused by surface loading. *Tire Shreds as Lightweight Retaining Wall Backfill: Active Conditions,* Tweedie, J. J., Humphrey, D. N., and Sanford, T. C., 1998, ASCE Journal of Geotechnical and Geoenvironmental Engineering, Vol. 124, No. 11, 1061–1070; *Shredded Tires and Rubber-Sand as Lightweight Backfill,* Lee, J. H., Salgado, R., Bernal, A., and Lovell, C. W., 1999, ASCE Journal of Geotechnical and Geoenvironmental Engineering, Vol.125, No.2, 132–141. Although the degree of settlement can be reduced by the appropriate mixture of soil and tire chips, the vibration loads induced on the mixture can easily cause segregation of the soil from the tire chips. Overall settlement of the fill will eventually develop under long-term conditions (Lee, et al., 1999). Furthermore, the overall unit weight of the tire chips and soil mixture is significantly increased. These factors will result in increased construction costs for a fill project.

The use of tire shreds as fill material may also be potentially subject to a process of pyrolysis. The moisture in the ground causes the steel contained in the tire shreds to corrode which, as corrosion is basically an exothermic process, leads to steady heat buildup which in turn causes an uncontrolled process of pyrolysis. The emitted gases may cause fire hazard and hydrocarbon oils may cause soil contamination. *Design guidelines to minimize internal heating of tire shred fills,* 1997, Ad Hoc Civ. Engrg. Com., Scrap Tire Management Counsel, Washington, D.C.; *Investigation of Exothermic Reaction in Tire Shred Fill Located on SR100 in Ilwaco, Washington,* Humphrey, D. N.; 1996, Report to the Federal Highway Administration, FHWA, Washington, D.C.

ASTM document D 6270-98, entitled *Standard Practice for Use of Scrap Tires in Civil Engineering Applications* limits the use of rubber chips containing steel wires to civil engineering applications where the fill thickness is less than 3 meters thick. For fill thicknesses of greater than 3 meters, wire-free rubber chips must be used in order to eliminate serious heating (pyrolysis) within the fill.

2. Description of the Related Art

A number of proposals have been made to make use of recycled rubber tires in construction and building materials.

U.S. Pat. No. 5,800,754 (Woods, 1998) discloses a process for forming a building unit from ground rubber tires with 15% to 20% of adhesive comprising asphalt. The mixture is then placed into a heated mound and subjected to heat and pressure to form a building block.

U.S. Pat. No. 5,425,904 (Smits, 1995) discloses a process for activating vulcanized waste rubber particles by treating the waste rubber particles with a rubber latex and curing and drying the treated waste rubber particles. Also disclosed are processes for producing a rubber-like article by molding the activated waste rubber particles while applying heat and pressure.

U.S. Pat. No. 5,316,708 (Drews, 1994) discloses a process of making building block members by mixing natural latex with shredded vehicle tires to form a mixture, placing the mixture in a mold, applying pressure to compress the mixture, and maintaining pressure for a time period which the latex hardens and cures.

U.S. Pat. No. 5,258,222 (Crivelli, 1993) discloses a process of mixing coarse rubber crumbs with coarse siliceous grains to form a closely packed mixture and wetting the surfaces of the coarse particles with a polymerizable liquid binder to provide a viscous slurry. The slurry is then cast into a sheet-like configuration, and the sheet-like configuration is used under sufficient heat and for a sufficient time to produce sheet-like products, such as: pavers, tiles, and shingles.

U.S. Pat. No. 5,094,905 (Murray, 1990) discloses a process of making structural articles from rubber tire fragments with adhesive. The tire fragments are mixed with an adhesive and molded, preferably under pressure, into a shape such as a rectangular beam. These items can be used as structural articles such as landscaping ties, dock bumpers for boat docks or truck loading docks, as resilient mats for workers or farm animals. Alternatively, it can be used as substitutes for various products that are normally made of wood but which do not need to withstand large longitudinal loads.

However, the proposals heretofore known suffer from a number of disadvantages:

The bonding agents are generally relatively expensive adhesive or latex compounds. The production costs of the resulting products are inevitably very high.

The molding processes are generally involved with heating and pressing in the mold for a substantial time period. Thus, the product and energy costs are increased substantially.

In a general sense, all the proposals heretofore resulted in the production of closely packed products for building, construction, and outdoor applications. The products thus have to resist relatively large structural loads, impact loads, and normal wear and tear as expected in most of the outdoor applications. However, the lightweight and granular natures of ground rubber crumbs are, generally not fully utilized in these proposals.

In terms of lightweight construction technology, U.S. Pat. No. 5,785,419 (McKelvey, 1998) teaches a process for developing a lightweight building material for use in above grade construction comprising cement, fly ash, cellulose fiber (mostly from recycled paper pulp), and water.

U.S. Pat. No. 5,569,426 (Le Blanc, 1996) involves the development of a lightweight cement block by mixing a predetermined ratio of sawdust, cement, sand, and water. However, this method and that of McKelvey have the major disadvantage that the resulting material can be slowly decomposed when it is buried below grade, especially under partially saturated conditions.

U.S. Pat. No. 5,785,419 (Rodgers, 1998) proposes a method for preparing a lightweight concrete include mixing a slurry comprising water, cementing binder, fine grain aggregate and polystyrene pellets. However, the cost of production of such a lightweight material is quite high and the resulting material is impermeable with a closed-form structure.

U.S. Pat. No. 5,290,356 (Frankowski, 1994) and U.S. Pat. No. 5,456,751 (Zandi, et al, 1995) disclose processes for making concrete materials which contain particulate rubber or rubber crumbs (preferably recycled from automobile tires). The materials proposed in these documents are typically used in cement boards, rubber reinforced mortar and road surfaces. However, similar limitations as for U.S. Pat. No. 5,785,419 (Rodgers 1998) occur as the resulting materials are impermeable because they have a closed pore structure.

Thus, there remains a need to produce not only an improved construction material having beneficial mechanical properties but also for providing, at least in preferred embodiments, an environmentally sound way of disposing of scrap rubber, and in particular rubber tires.

SUMMARY OF THE INVENTION

In accordance with the present invention a new lightweight and porous construction material is created. The material mainly consists of rubber bits, cementitious materials such as Portland and/or slag cement, fly ash or pulverized fly ash (PFA), elastic binding compound such as rubber powder or polymer fibers (filaments) and water. The rubber bits are typically derived from scrap rubber tires. Alternatively, the rubber bits can be generated from other means, such as recycled rubber crumbs derived from other rubber products. The said materials are thoroughly mixed to form slurry. The slurry can be used as cast-in place lightweight and porous construction material or the slurry can be molded into lightweight construction blocks. The construction material/blocks can be applied to various civil and geotechnical works in place of conventional fill or backfill soils. Uses of the lightweight construction material/blocks include, but are not limited to the following earthworks: embankments, retaining structures, fill slopes, backfill, underground works, road fill, highway pavement road-base or sub-base, and land reclamation.

BRIEF DESCRIPTION OF THE FIGURES

Some preferred embodiments of the present invention will now be described, by way of example only, and with reference to the accompanying drawings, in which.

DETAILED DESCRIPTION OF THE PREFERRED EMBODIMENTS

Figure 1:
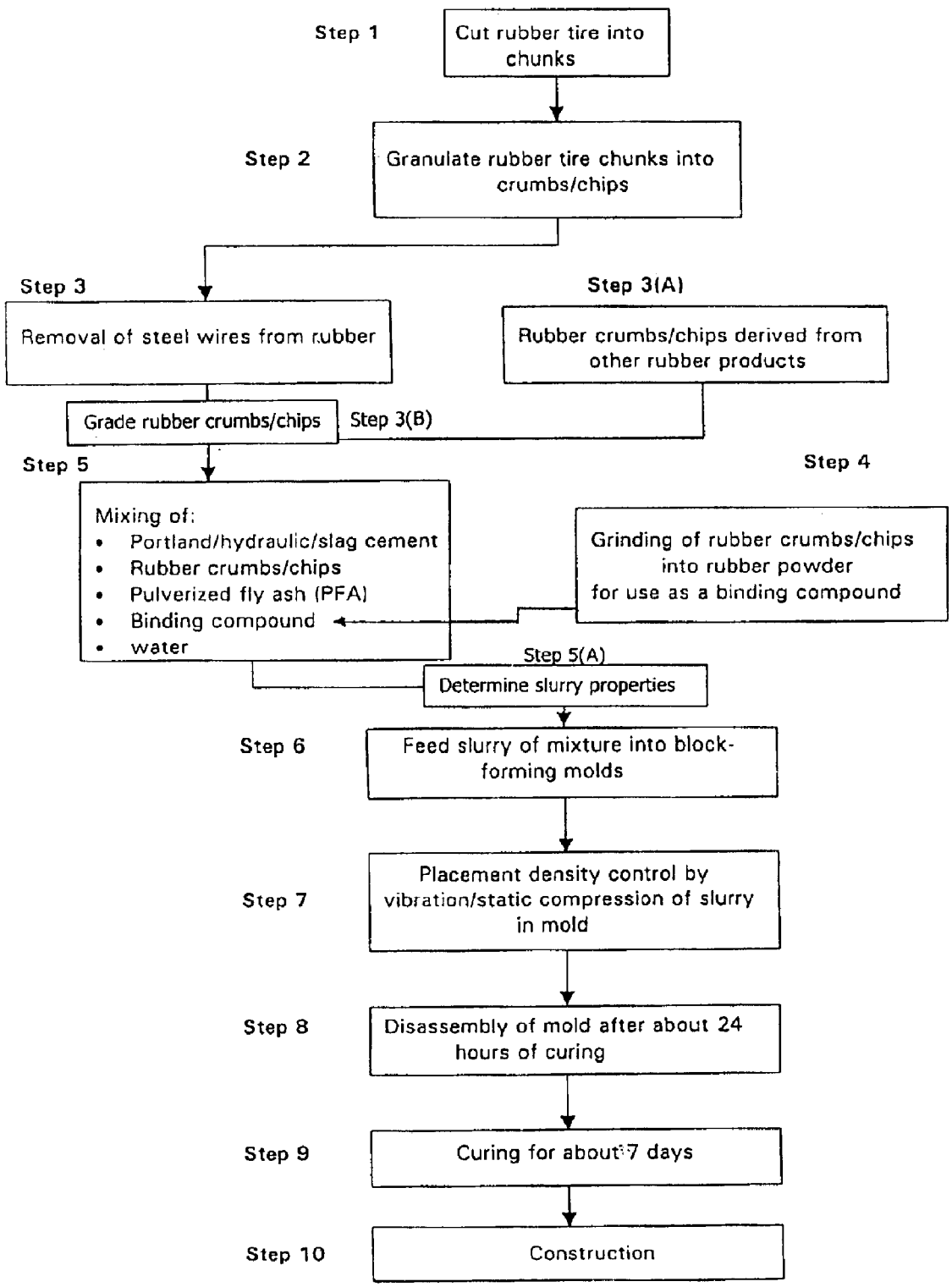
FIG. 1 shows a general flow diagram of the process for producing a rubberized construction material according to the present invention and its casting into block form.

In broader terms, the present invention provides a process for manufacturing a construction material, comprising mixing a cementitious material, rubber bits and water and curing the mixture to form a porous matrix with interconnected pore spaces in which the rubber bits are bonded together by the cementitious material. In general, the bonding between the rubber bits is mainly achieved by the hardened cementitious material (cement gel). The resulting rubberized construction material has a lightweight and porous structure which has long-term chemically and mechanically stable constituents which allow it to be used for normal applications in civil and geotechnical works. The reduction in weight of the rubberized construction material over conventional materials has the advantage of greatly reducing the structural design loads and/or earth pressures where it is employed. The porous nature of the rubberized construction material is also advantageous as it allows free drainage of water and eliminates the problems of pore water pressure build-up.

The invention extends to a construction material made by the process described herein. It also extends to a construction material comprising cured cementitious material and rubber bits, the rubber bits being bonded together in a porous matrix by the cementitious material. The porous matrix comprises interconnected pore spaces which allow free drainage through the construction material.

The cementitious material preferably substantially covers the rubber bits and bonds them into the matrix having a porous structure. The spaces between the bonded together rubber bits provide the possibility to permit free drainage through the construction material.

The bits of rubber used in the rubberized construction material may be of any size, but they are preferably granules, such as crumbs and/or chips. In order to improve the porosity of the cured rubberized construction material, it is further preferred that bits of nearly uniform grade or gap-graded particle sizes are used. Rubber granules of uniform size will tend to form an open matrix structure, in contrast to randomly sized particles, which tend to settle into a closed matrix structure.

It is further preferred that a binding compound is included in the rubberized construction material to improve the strain compatibility of the cementitious material and the rubber bits. Once cured, the cementitious material is relatively brittle, in contrast to the rubber bits which remain relatively ductile and elastic; thus, the strain characteristics of the two materials are incompatible. The binding compound functions as an elastic binder to increase the flexibility of the hardened cementitious material and, therefore, to improve the strain compatibility of the rubberized construction material.

Preferably the binding compound is a rubber powder, a polymer fiber/filament, and aqueous rubber latex, a polyurethane, a rubber solution prepared by dissolving vulcanized rubber in a chlorine-substituted hydrocarbon solvent (dissolved rubber solution), or a combination thereof. If a rubber powder is to be used it may be obtained by grinding rubber granules to the appropriate size. Rubber powder is the least expensive of the available binding compounds. Polymer fibers provide the best mechanical performance, where the polymer fibers could be either new material or recycled waste polymer fibers. Aqueous rubber latex or polyurethane increase the strength and flexibility of the hardened cement gel. Dissolved rubber solution is an alternative to rubber powder as a low cost binding compound.

The rubber bits used in the rubberized construction material may be obtained from natural, synthetic, vulcanized or scrap sources. However, a preferred source for the rubber bits for the present invention is scrap rubber, such as from scrap tires. In addition to its advantageous physical properties, the rubberized construction material provides an extremely useful means for dealing with the otherwise problematic disposal of scrap rubber and, in particular, the ongoing problems of dealing with large numbers of scrap tires. Where rubber powder is used as the binding compound, this may also be derived from scrap rubber.

A preferred ratio of cementitious material to rubber bits, by weight, is one part cementitious material to 0.7 to 2.5 parts rubber bits, inclusive. By varying the ratio to the mechanical and hydraulic properties of the rubberized construction material may be varied, as required. For example, if the ratio is one part cementitious material to 0.7 parts rubber bits, a high strength material having low porosity is obtained. In contrast, a ratio of one part cementitious material to 2.5 parts rubber bits produces a lower strength, highly porous material. A ratio of one part cementitious material to less than 0.7 parts rubber bits results in a construction material having a low coefficient of permeability because the voids between the rubber bits are filled with cementitious material, resulting in a non-porous internal structure. While preferred ratios are disclosed, any range of ratios of cementitious material to rubber bits may be employed, depending on the desired properties of the construction material.

A preferred ratio of cementitious material to water, by weight, is one part cementitious material to 0.3 to 0.8 parts of water, inclusive. Again by varying the ratio the mechanical and hydraulic properties of the rubberized construction material may be varied. For example, if the ratio is one part cementitious material to 0.3 parts water, a high strength material is obtained but which has low workability prior to curing. In contrast, a ratio of one part cementitious material to 0.8 parts water produces a lower strength material that is highly workable prior to curing. Of course, any intermediate ratio of cementitious material to water may be employed depending on the desired material properties.

A preferred ratio of cementitious material to binding compound, by volume, is one part cementitious material to up to, and inclusive of, 2 parts binding compound. Again, by varying the ratio the mechanical and hydraulic properties of the rubberized construction material may be varied. In applications where ductility of the rubberized construction material is not the primary concern, binding compound is not required in the mixture. If ductility of the material is important, 2 parts of binding compound substantially increases the ductility thereof. Of course, intermediate ratios of cementitious material to binding compound may be employed, depending on the desired material properties.

By varying the composition of the rubberized construction material and its density may also be varied. Typically, the density of the rubberized construction material may be only about ⅓ of that of cement or about ¼ of that of concrete. Alternatively, the density of the construction material can be reduced by substituting a portion of rubber bits with lightweight aggregate filler, such as sawdust, polystyrene pellets, cellulose fiber, expanded and dehydrated clay pellets, dehydrated and cemented bio-mass pellets, furnace bottom ash and pellets or the like, or any combination thereof.

Preferably the construction material according to the present invention may contain a range of aggregate, such as sand, gravel or the like. If no aggregate is used, this would benefit the lightweight and low density properties of the material. If higher strength and stiffness of the rubberized construction material is required, up to 90% by weight of the rubber bits can be substituted by the aggregate; however, this could result in a higher density of the cured material.

Through testing, a slurry in which the rubber bits are thoroughly coated with cementitious material, but in which the voids between adjacent rubber bits are not filled with cementitious material can be achieved. Such a slurry results in a construction material having the desired drainage and density characteristics. If there is too much cementitious material, the voids are filled. In many cases, experimentation is required to arrive at the correct ratios for a given set of raw materials.

Preferred cementitious materials are Portland cement or slag cement. To reduce production costs fly ash, pulverized fly ash (PFA), or equivalent materials may be used in place of some or all of the Portland or slag cement. Fly ash and PFA are by-products of burning powdered bituminous coal in electric generating power plants and typically require disposal in landfills. Thus, the use of fly ash and PFA in the rubberized construction material is beneficial in reducing the amount of landfill space which would otherwise be required for their disposal. Local environmental regulations must, however, be checked before fly ash and PFA are used as cementitious materials for outdoor construction applications. The gain of strength of the rubberized construction material with time will significantly slow down with a high percentage of fly ash or PFA in place of Portland or slag cement.

The rubberized construction material according to the present invention may be cast-in-place at the construction site and allowed to cure in situ; or it may be poured into block-forming molds and allowed to cure prior to transportation to, and use at, the construction site. Thus, the construction time for projects employing the rubberized material may be reduced and the amount of space required for construction and the affiliated works may be reduced allowing the total construction costs to be reduced.

If the rubberized construction material is cured in blocks, they may advantageously be stacked like conventional concrete blocks and also used to create vertical walls. Indeed, because of their light weight, blocks made from the rubberized construction material may be handled by humans and, thus, they may be installed in confined spaces, on weak soils, on acute grades as well as being cut and sized in position. This method of production also allows the rubberized construction material to be manufactured under controlled and specific environments and allows quality control and quality assurance to be conducted during the manufacturing stage.

Irrespective of the method employed for producing the rubberized construction material, the placement density is preferably controlled during casting by vibration or static compression means i.e., weight placed on the slurry. The desired void ratio and placement density dictate the methods used during casting/placement. Experimentation may be required to achieve the desired attributes for a given set of raw materials or casting conditions. The resulting density, void-ratio, and mechanical behaviours of the rubberized construction material can be more consistently achieved than in known equivalent materials, such as in-situ compaction fill or backfill soils, which are imprecise and variable. Vibration and/or static compression can be applied to the rubberized construction material under fresh and un-hardened condition to a void ratio (e) in the range of 0.05 to 2.0. The void ratio (e) of the construction material is defined as in the following equation:

$$e = V_v/V_s$$

where, $V_v$ is the total volume (m$^3$) of void space of the said material, and $V_s$ is the total volume (m$^3$) of solid phase of the said material The bits of rubber used in the rubberized construction material are preferably granules, such as crumbs and/or chips. In order to improve the porosity and interconnection of the void spaces in ensuring permeable internal structure of the material, it is further preferred that rubber bits or aggregates of nearly uniform graded or gap-graded particle sizes are used. The amount of energy induced by the vibration and/or static compression shall be calculated beforehand so that the change in the total volume of void spaces induced by the imposed energy shall result in the void ratio of the said material within the preferred void ratio range of 0.05 to 2.0.

In calculating the amount of vibration and/or static compression to be applied on the slurry of the said construction material, the following mathematical equations can be used to estimate the resulting void ratio of the compacted density of the said construction material.

In estimating the permanent settlement (S) induced by the compaction efforts, the following equation can be used:

$$S = C_{rs} \frac{H_o}{1+e_o} \log\left(\frac{E_o + \Delta E}{E_o}\right)$$

where:
$E_o$=initial energy induced on the slurry of the fresh rubberized construction material (for example, such as the dead weight of the compactor).
$\Delta E$=the applied energy induced by the vibration and/or static compression efforts.
$H_o$=the initial height of freshly placed slurry under the influence of the initial energy ($E_o$), this value can be directly measure before the compaction commence.
$e_o$=the initial void ratio of the fresh slurry under the influence of the initial energy ($E_o$), this value can be directly measure before the compaction commence; the specific gravity $G_s$ of the slurry (typically in the range of 1.2 to 1.25) may be used to estimate the initial void ratio $e_o$.
$C_{rs}$=the slope of the compression curve of the fresh slurry determined by a one-dimensional compression (consolidation) test (an appropriate test is defined by the ASTM or British Standard (BS1377: part 5)), which is expressed in terms of the void ratio versus the logarithm of the applied stress.

After the permanent settlement (S) of the compacted slurry is estimated, the change in void ratio (Δe) of the compacted slurry can be calculated by the following equation:

$$\Delta e = \frac{S}{H_o}(1+e_o)$$

The final compacted void ratio (e) of the rubberized construction material can then be calculated by the following equation:

$$e = e_o - \Delta e$$

Experimentation may be required to properly define the attributes of the compaction efforts in terms of static compression or vibration or a combination hereof. It is generally found that the magnitude of static compression of not greater than 1000 kPa, or a vibration frequency of not more than 500 Hz, or a combination thereof, can achieve the targeted range of the final compacted void ratio (e) of 0.05 to 2.0. If the compaction effort is too high, the resulting void ratio of the compacted material could be too low, which will render the material to be impermeable and beyond the art of the present invention. On the other hand, if the compaction effort is too low and resulting the compacted void ratio of the material less than 2.0, the material could be too loose and too compressible, which deprive the mechanical characteristics of the material. The compaction energy can be applied, for example, by the following means: hydraulic actuator, pneumatic actuator, static or vibrating tamper, static or vibrating rammer, static or vibrating plate compactor, static or vibrating roller, smooth wheeled drum roller, vibration table, vibration probe, or the like.

Another important aspect in ensuring the interconnecting void spaces in resulting permeable internal structure of the said material is the specific ranges of particle size distribution as defined above. Rubber bits, gravely aggregates or lightweight aggregates are said to be well-graded when it has a good representation of particle sizes over a wide rage, and its particle size distribution curve is smooth and generally concave upward. On the other hand, a poorly graded rubber bits (gravely or lightweight) aggregates would be one where there is either an excess or deficiency of certain sizes (gap-graded) or if most of the particles are about the same size (uniformly graded). In the present invention, it is preferred that the rubber bits or (gravely or lightweight) aggregates be either uniformly graded or gap-graded. In classifying such graduation of particle size distributions, it is preferred that either the coefficient of uniformity ($C_u$) of the rubber bits or (gravely or lightweight) aggregates distribution is smaller than 6 or the coefficient of curvature ($C_c$) of the rubber bits or (gravely or lightweight) aggregate distribution is outside the range of 1.5 to 2.5 (i.e. $C_u$<6 or $C_c$<1.5 or $C_c$>2.5).

The coefficient of uniformity ($C_u$) is defined as:

$$C_u = \frac{D_{60}}{D_{10}}$$

where:
$D_{60}$=particle diameter corresponding to 60% passing (by weight) as obtained from the sieve analysis, and
$D_{10}$=particle diameter corresponding to 10% passing (by weight) as obtained from the sieve analysis.
While the coefficient of uniformity ($C_u$) is defined as:

$$C_c = \frac{D_{30}^2}{(D_{10})(D_{60})}$$

where:
$D_{30}$=particle diameter corresponding to 30% passing (by weight) as obtained from the sieve analysis.

The following Table 1 summarizes the engineering performance of the resulting construction material in comparison with conventional granular backfill soils.

| Engineering Performance | Proposed Rubberized Construction Material | Conventional Granular Backfill Soils |
| --- | --- | --- |
| Uniaxial Compressive Strength ($q_u$) | 200 kPa to 5 MPa | 30 kPa to 100 kPa |
| Axial Strain at Failure | 2% to 10% | 2% to 4% |
| Mohr-Columb Failure Strength: Cohesion (c) | 100 to 2000 kPa | 0 to 10 kPa |
| Mohr-Columb Failure Strength: Internal Angle of Friction ($\phi$) | 10° to 40° | 30°–40° |
| Elastic Modulus (E) | 30 to 1000 MPa | 10 to 50 Mpa |
| Compacted Bulk Density (p) | 700 to 1000 kg/m$^3$ | 1600 to 2100 kg/m$^3$ |
| Coefficient of Earth Pressure at Rest ($K_0$) | Less than 0.05 (0.02 typical) | 0.4 to 0.8 |
| Coefficient of Permeability (k) | $10^1$ to $10^{-4}$ cm/sec | $10^{-4}$ to $10^{-6}$ cm/sec |

The rubberized construction material according to the present invention may be employed for any number of construction projects, such as retaining structures, fill slopes, road fills, reclamation works, and so on, but is especially advantageous when used as fill or backfill for earthworks. Further possible earthwork applications for the rubberized construction material, and blocks formed therefrom, include embankments, retaining structures, fill slopes, backfilling works, road fills, highway pavement road-base or sub-base layer, road widening and raising, underground utilities channels, back-filling behind retaining structures and land reclamation.

Viewed from another aspect, the rubberized construction material according to the present invention provides an effective and inexpensive particle bonding technology to bond rubber crumbs/chips together into a new rubberized lightweight and porous construction material providing free drainage therethrough. The bonding agent mainly comprises of cementitious materials such as Portland/hydraulic/slag cement, fly ash or PFA, binding compound such as rubber powders, polymer fibers (filaments), aqueous rubber latex, polyurethane, or rubber solution prepared by dissolving vulcanized rubber in a chlorine-substituted hydrocarbon solvent.

Production Process and Applications

FIG. 1 is a block diagram schematically showing the steps followed to create rubberized lightweight construction blocks in accordance with the present invention.

The first stage in the process is to remove the steel beads around the inner rim of the rubber tires into chunks (step 1). The tire chunks are then fed into a granulation machine and granulated into rubber bits in the form of rubber crumbs/chips (step 2) and then any steel wires embedded in the chips are removed by wire and fiber removal techniques leaving pure rubber crumbs, chips (step 3). Removal of the steel wires can be avoided if the fill thickness is less than 3 meters—as specified in ASTM D 6270-98. Alternatively, rubber bits may be manufactured or obtained from other sources (step 3(A)) and used instead of, or in conjunction with, those derived from scrap tires (steps 1 to 3). The rubber particles are then graded (Step 3(B)) so that an aggregate having a particular coefficient of uniformity $C_u$ or distribution coefficient of curvature $C_c$ in a particular range may be used as described herein.

A predetermined proportion of cementitious materials, such as Portland/hydraulic/slag cement, fly ash or PFA (if required), and water are then thoroughly mixed with the rubber bits, gravely or lightweight aggregates (step 5) to form a slurry mixture. The rubber bits in the resulting slurry are then substantially coated by the cement gel. This slurry is then tested in Step 5(A) to determine the slurry's characteristics for use in calculation of the amount of additional energy $\Delta E$ to be applied to achieve a particular void ratio e.

Tremie pipes or belt conveyors then transfer the slurry mixture into block-forming molds with predetermined shapes and configurations (step 6). Care must be taken to avoid excessive segregation of the cement from the rubber bits during placement in the molds. The required placement density (alternatively expressed in terms of void ratio e) of the hardened material can be achieved by placing a predefined mass of the slurry mixture into a block-forming mold of a specific volume and subjecting it to a predetermined energy $\Delta E$ of vibration or using static compression means (step 7). A vibration table or vibration probe(s) can be used to impart the vibration energy to the mixture under a specific vibration amplitude and time interval. Alternatively, static compression can be used to control the placement density of the slurry mixture in the mold. In order to achieve uniformity of the slurry during the molding process, static compression can be conducted in multiple lifts so that the multiple layers of the slurry are compressed in the mold into a predetermined thickness. The compacted rubberized slurry mixture is preferable to have an internal void ratio (e) between 0.05 and 2.0. The compaction ($\Delta E$) required to achieve a given void ratio e is determined by the methods as prescribed above.

Then, after about 24 hours of curing, the forming molds can be disassembled as "green" blocks (step 8) which in turn are cured under partially humid conditions for approximately 7 days (step 9). The strength of the rubberized construction blocks will continue to increase with time but after the extended curing period they are suitable for use in construction applications (step 10). The matured design strength of the block will be reached at about 28 days after initial casting. If fly ash or PFA is used to substitute a portion of the Portland Cement, the mature strength of the construction blocks could be reached at about three months after initial casting.

Figure 2:
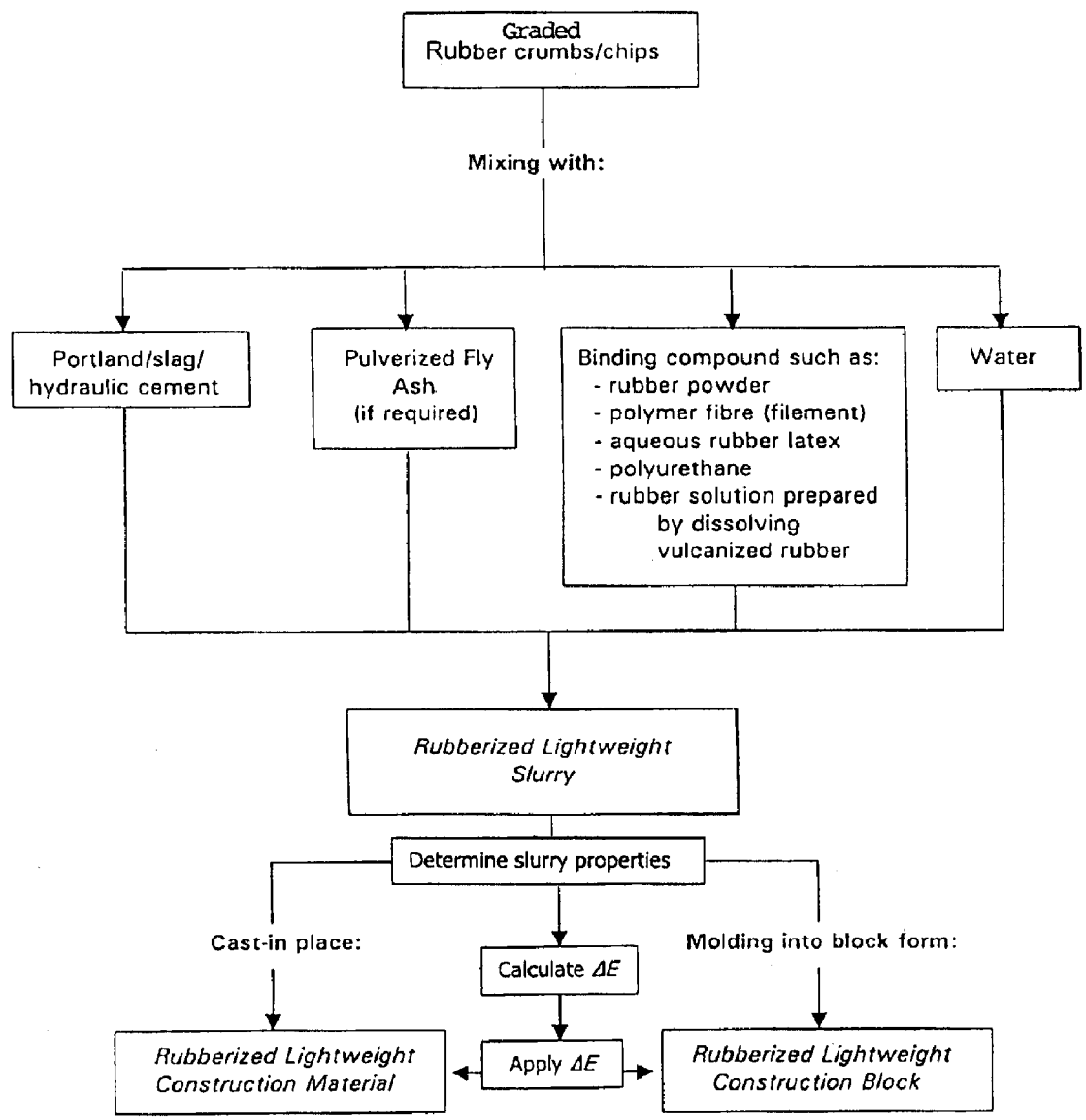
FIG. 2 shows a general flow diagram of the process for producing a slurry mixture of the rubberized construction material and possible casting methods thereof.

As an alternative to casting the rubberized construction material into blocks, the slurry mixture can be used directly as a cast-in-place material which cures in situ, as shown in FIG. 2. This alternative production method increases the number of applications in which the rubberized construction material may be employed.

In order to maintain the porosity of the cured rubberized construction material and blocks, rubber bits of nearly uniform grade or gap-graded particle sizes are recommended (the principle is similar to the formation of no-fine concrete mixture). The compressive strength of the hardened construction material can be increased or decreased by adjusting the cement/rubber bits ratio and the workability of the slurry can be adjusted by changing the water/cement ratio. Substituting a portion of rubber bits with lightweight non-cementitious filler, such as sawdust, polystyrene pellets, cellulose fiber, dehydrated and cemented bio-mass pellets, expanded and dehydrated clay pellets, furnace bottom ash or pellets, or any combination thereof can further reduce the density of the rubberized construction material. The cost of the cementing agent can be reduced by substituting a portion of the Portland cement with fly ash or PFA, but, local environmental regulations must be checked before using fly ash or PFA.

A specific preferred formula for the rubberized construction material is as follows:

Portland Cement:PFA:water:rubber powder:tire bits (by weight)= 0.5:0.5:0.45:0.167:1.7

This formula results in a construction material (suitable for use as a lightweight backfill) having the following properties:

| | |
|---|---|
| Uniaxial Compressive Strength | 400 kPa |
| Axial Strain at Failure | 9% |
| Elastic Modulus | 40 MPa |
| Compacted Dry Density | 900 kg/m$^3$ |
| Cohesion Intercept (defined by Mohr-Columb Failure Envelope) | 150 kPa |
| Internal Angle of Friction (defined by Mohr-Columb Failure Envelope) | 10° |
| Coefficient of Earth Pressure at Rest | 0.02 |
| Coefficient of Permeability | $10^1$ to $10^{-2}$ cm/sec |
| Porosity | 28% |

Such a material can be considered a moderate strength, highly porous lightweight construction material when compared to conventional fills or concrete. The construction material is relatively weak compared with concrete and is not intended as a direct substitute therefor. When compared to conventional fills, however, the construction material is less dense, exerts markedly less earth pressure, and it is much more porous and very stable due to its ductility and compressive strength.

Another specific preferred formula for the rubberized construction material is as follows:

Portland Cement:PFA:water:tire rubber bits:sand:gravel:polymer fiber (by weight)=1.0:0.5:0.62:1.0:1.5:3.5:0.003

This formula results in a construction material (suitable for use as a highway pavement sub-base or road-base material) having the following properties:

| | |
|---|---|
| Uniaxial Compressive Strenth | 4500 kPa |
| Axial Strain at Failure | 2–3% |
| Resilient Elastic Modulus | 1000 MPa |
| Compacted Dry Density | 1800 kg/m$^3$ |
| Cohesion Intercept (defined by Mohr-Columb Failure Envelope) | 1500 kPa |
| Internal Angle of Friction (defined by Mohr-Columb Failure Envelope) | 35° |
| Coefficient of Earth Pressure at Rest | 0.05 |
| Coefficient of Permeability | $10^{-2}$ to $10^{-4}$ cm/sec |
| Porosity | 15% |

When the rubberized construction material is mixed without a binding compound and allowed to cure, the hardened pure cement gel is relatively brittle in nature, where the ductility and elasticity of the consitiutive materials is inconsistent. By adding rubber powder or polymer fibers (filaments) to the cementing agent to act as an elastic binder (binding compound), step 4 of FIG. 1, the flexibility of the cement mixture is increased and the strain compatibility of the cementing agent is improved. The rubber powder may, for example, be obtained by feeding rubber granules obtained from the scrap rubber into a grinding machine.

Figure 3:
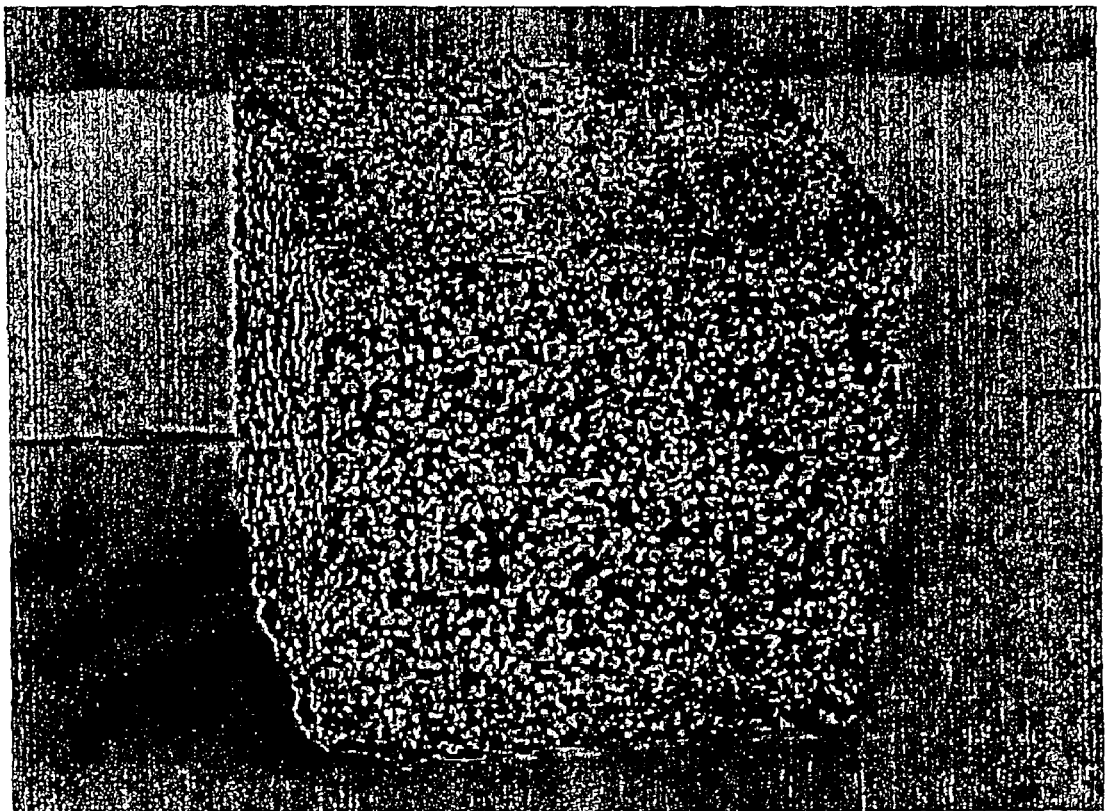
FIGS. 3 and 4 are photographs of a molded block of the rubberized construction material as produced according to FIGS. 1 and 2.
Figure 4:
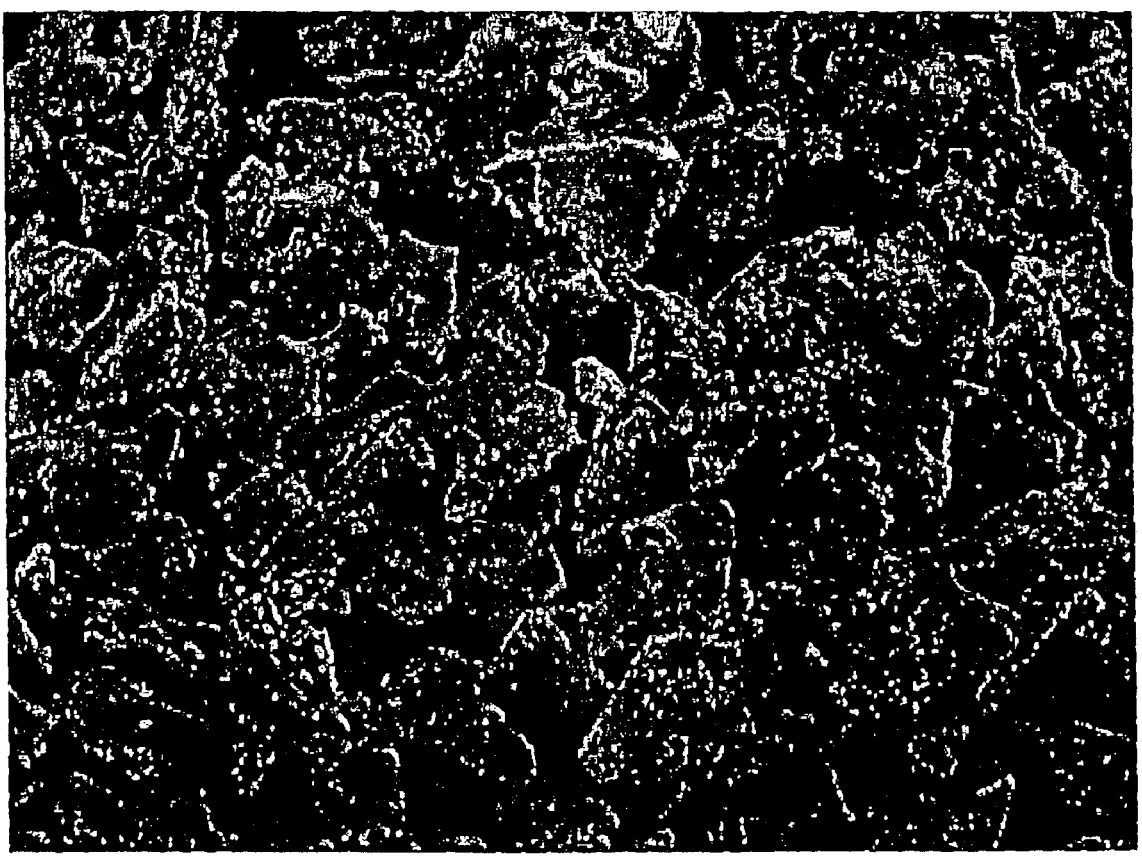

FIG. 3 is a photograph showing an example of a molded block 1 of the rubberized construction material 2 as produced according to the methods of FIGS. 1 and 2. The sample block is approximately 0.8 m (length)×0.4 m (width)×0.2 m (height) and it weighs about 50 kg. FIG. 4 shows a close up view of the bonding mechanism of the rubber tire bits with hardened rubberized cement gel.

Figure 5:
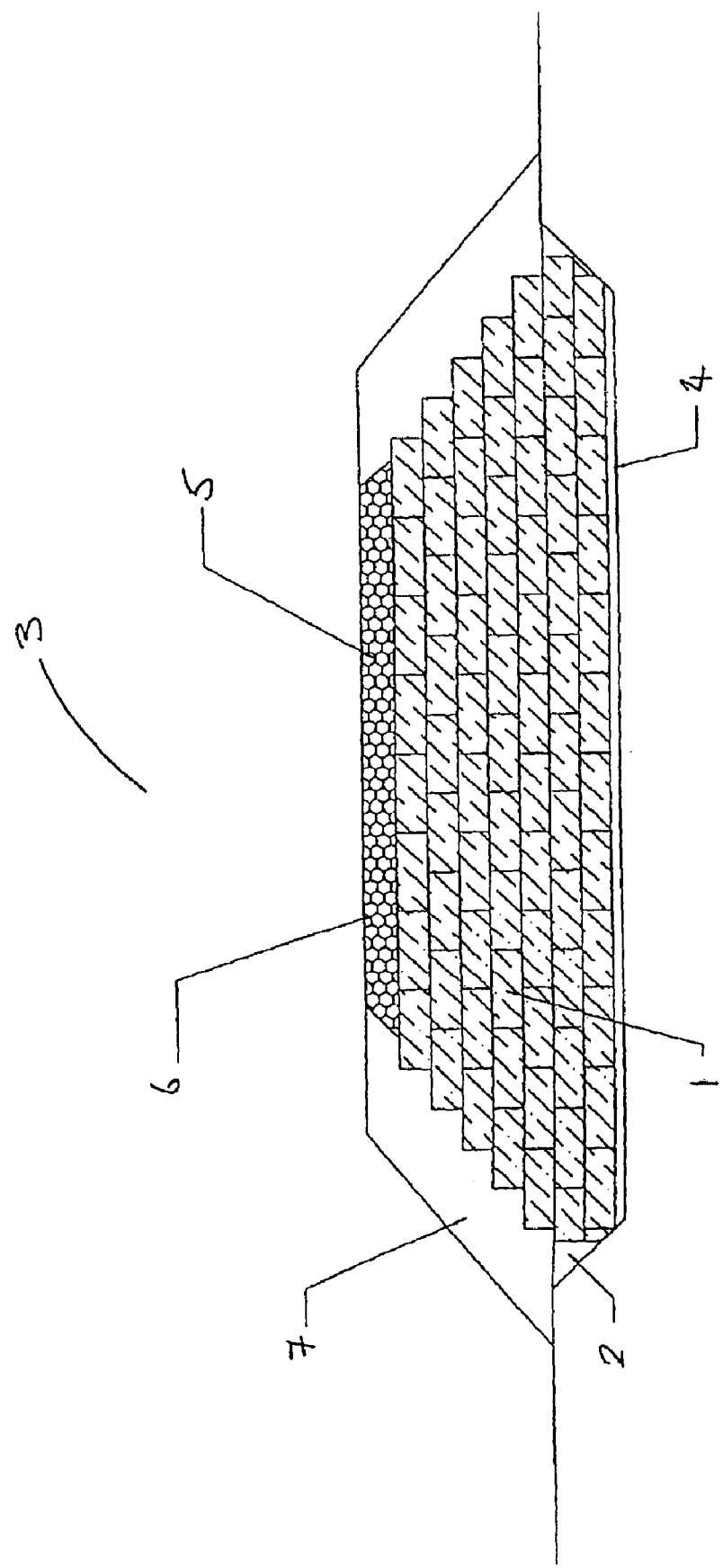
FIGS. 5 to 14 show general examples of possible uses of the rubberized construction material and blocks.

FIG. 5 shows an example of an embankment construction 3 utilizing rubberized construction blocks 1 and rubberized construction material 2 according to the present invention. The rubberized construction blocks 1 are placed on top of a gravel sublayer 4 and built up to the required level. If necessary, the rubberized construction blocks 1 may be secured in place with additional rubberized construction material 2 which is cast-in-place. A subgrade 5 is placed on top of the upper layer of the rubberized construction material 2 to form a base for a road pavement 6 on top of the embankment 3. Cover soil is placed on the side slopes of the embankment 3 for fire protection and landscaping purposes.

Figure 6:
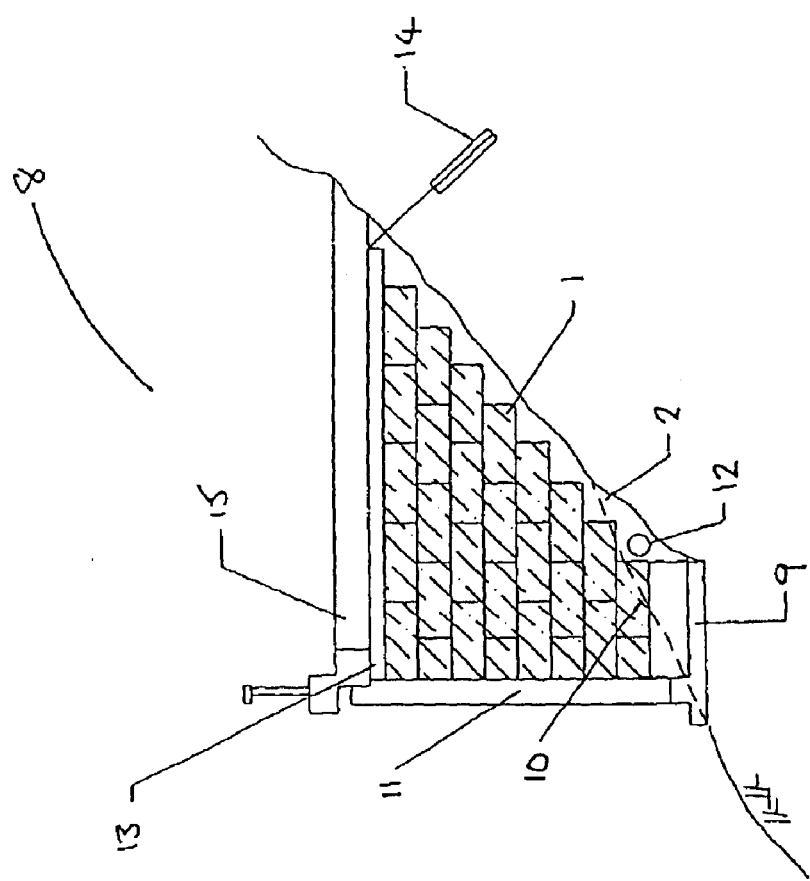

FIG. 6 shows a possible use of rubberized construction blocks 1 and rubberized construction material 2 to create a retaining wall 8. A reinforced concrete footing 9, having vertically extending retaining panels 11, is positioned on the existing slope surface 10. The resulting space between the retaining panels 11 and the slope surface 10 is filled with a combination of rubberized construction blocks 1 and rubberized construction material 2. The downward force of this rubberized construction material 2 and blocks 1 on the reinforced concrete footing 9 secure it and the retaining panels 11 in place. The blocks 1 are shaped such as to advantageously allow them to be stacked and positioned flush with the retaining panels 11. The rubberized construction material 2, which is cast-in-place, provides a useful bedding for the rubberized construction blocks 1. The porosity of the rubberized construction material 2 and the blocks 1 allows free drainage through the structure to a drainage pipe 12. A ground reinforcement 13 is placed on top of the rubberized construction blocks 1 and secured in place by a ground anchor 14. A road pavement 15 is then constructed level with the top of the retaining wall 8.

Figure 7:
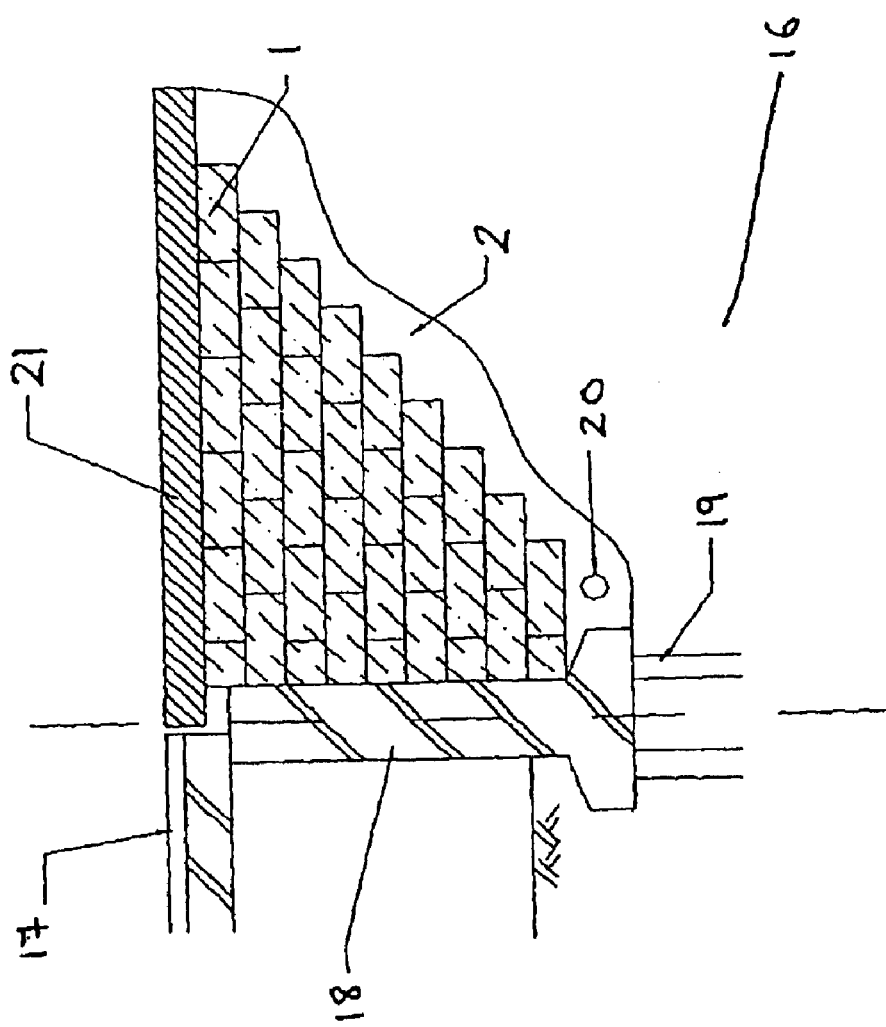

FIG. 7 illustrates a possible way of constructing an abutment wall 16 for a bridge deck 17 utilizing combination of rubberized construction material 2 and rubberized construction blocks 1 in a similar manner to the retaining wall 8 shown in 6. As shown in FIG. 7, the abutment 18 is located on a foundation 19 with the bridge deck 17 located on top thereof. The rubberized construction blocks 1 are positioned on a bed of the rubberized construction material 2 flush with the side of the abutment. A drainage pipe 20 may be located under the rubberized construction blocks 1, and held in place by the rubberized construction material 2, to drain away water which filters down through the rubberized construction material 2 and blocks 1. A road pavement 21 is constructed on top of the uppermost layer of the rubberized construction blocks 1 level with the bridge deck 17.

Figures 8A, 8B:
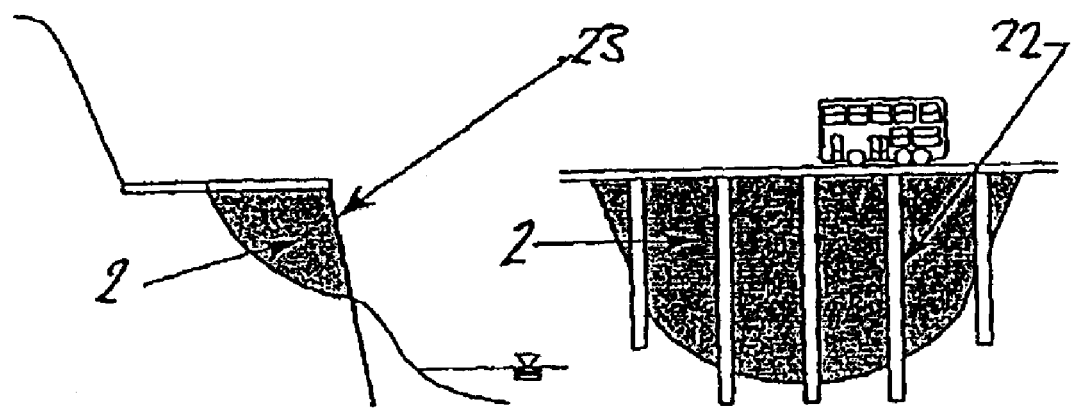

FIG. 8a shows a cross sectional view of a further possible application of the rubberized construction material 2 for use in road widening. The rubberized construction material 2 is cast-in-place as a slurry mixture in conjunction with a series of structural members 22, as shown in FIG. 8b. this method allows roads to be widened on steep slopes. The casting-in-place of the rubberized construction material 2 also allows vertical walls or steep slopes 23 to be created.

Figure 9:
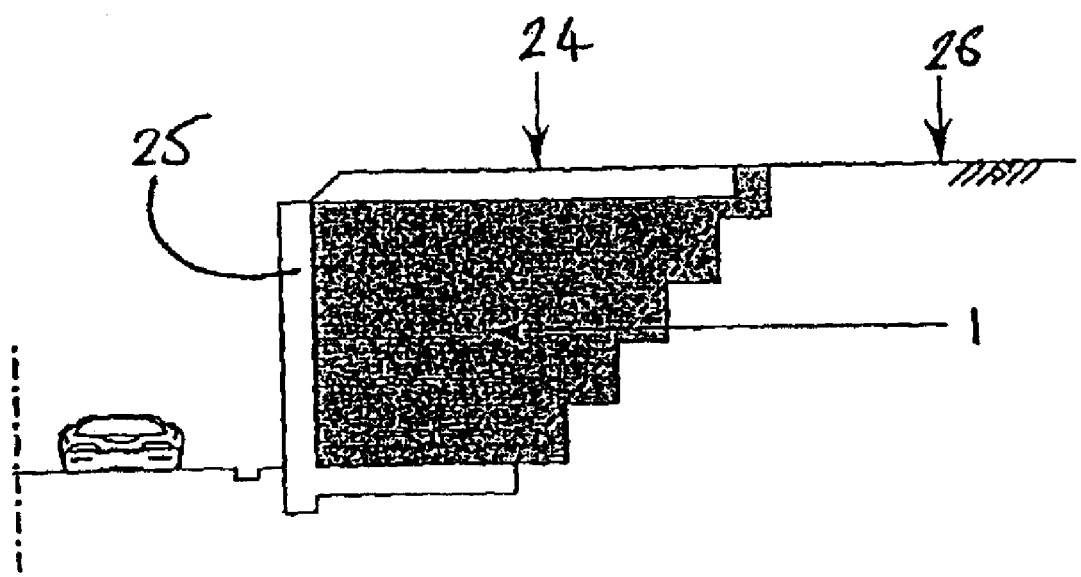

Rubberized construction blocks 1 may also be employed to create new roads 24, as shown in FIG. 9. The surrounding terrain is raised to the appropriate level using several layers of the rubberized construction blocks 1 and in conjunction with standard retaining methods 25, the new road 24 created on top thereof. As shown in FIG. 9, the new road may be created along an existing road 26.

Figure 10:
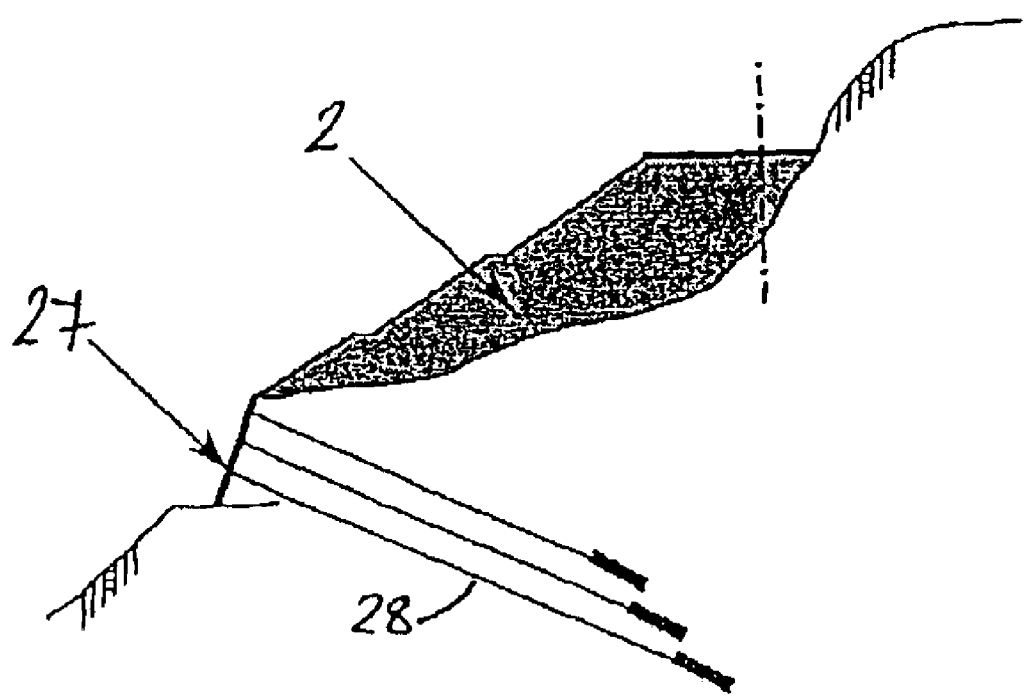

As shown in FIG. 10, the rubberized construction material 2 may be used as a fill slope. The rubberized construction material 2 is cast-in-place and a retaining system 27, in conjunction with ground anchors 28, secures it in place. The exposed surface of the rubberized construction material 2 may be contoured as required, for example to provide a level surface or path.

Figures 11A, 11B:
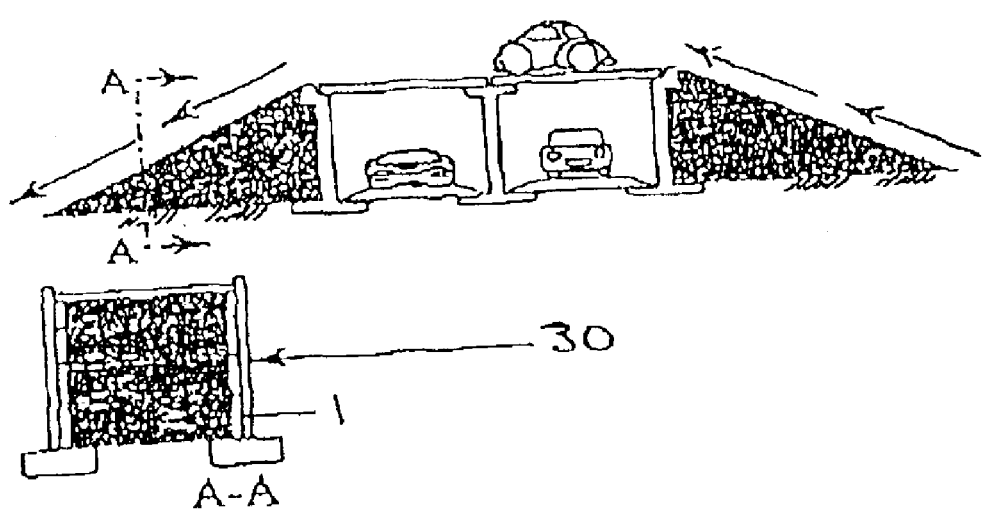

FIG. 11a shows a further possible use of rubberized construction blocks 1 to create an elevated highway and bridge approach. The elevated by-pass 29 is retained by "H" beam supporting posts 30 constructed from precast concrete panels, as shown in FIG. 11b. the ramps up to the level of the elevated by-pass 29 are constructed from staggered layers of rubberized construction blocks 1.

Figure 12:
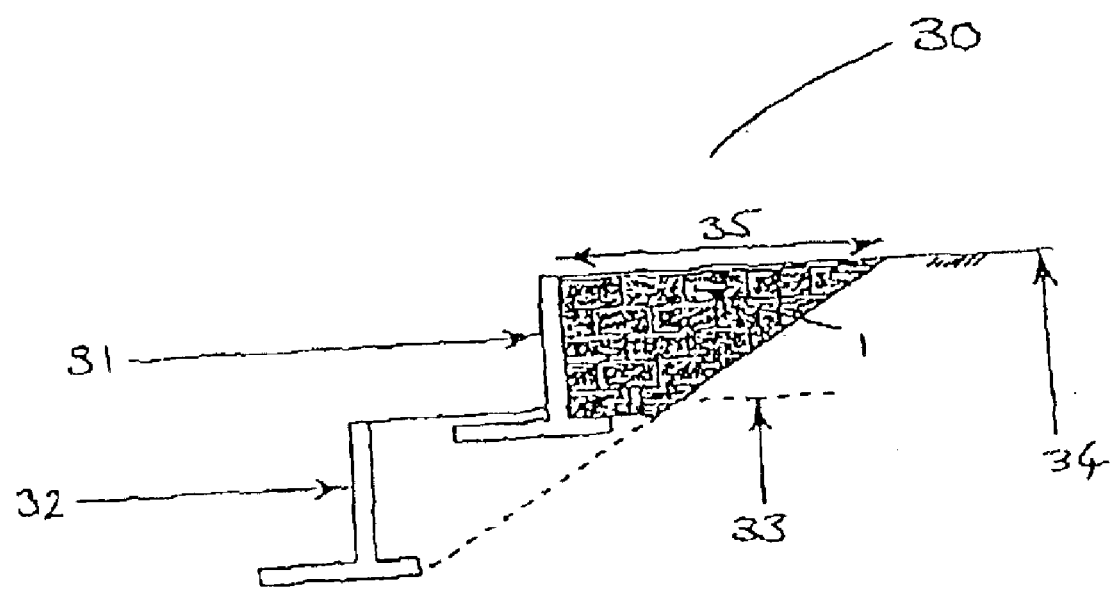

The rubberized construction blocks 1 may be used to construct a multiple wall arrangement 30, for example to raise the ground level, as shown in FIG. 12. The retaining wall members 31 have an inverted "T" cross-section and are staggered back from the existing wall 32. The horizontal portion of the retaining wall members 31 is positioned beneath the existing ground level 33. The rubberized construction blocks 1 are then positioned on the side of the retaining wall member 31 away from the existing wall 32 and retain them in place. The rubberized construction blocks 1 are built up to the planned ground level 34 and each additional layer progressively extended away from the retaining wall 31 to create a widened area 35 behind the retaining wall 31 which prevents degradation of the planned ground level 34. A number of such retaining walls 31 may be used to create a "stepped" increase in the ground level.

Figure 13:
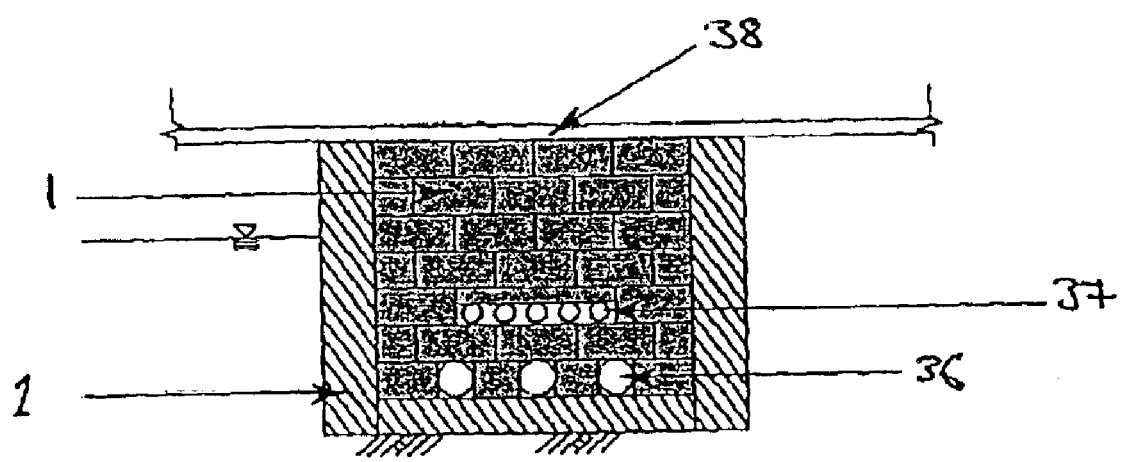

A combination of rubberized construction blocks 1 and cast in place rubberized construction material 2 may be used to create a channel for underground utilities and to secure said utilities in position, as shown in FIG. 13. The outer portion of the channel is cast-in-place using the rubberized construction material 2. Underground pipes 36 and utility trunks 37 are positioned inside the channel and secured in place by rubberized construction blocks 1. The channel is then filled with rubberized construction blocks 2 such that a pavement 38 may be located directly on top of the channel.

Figure 14:
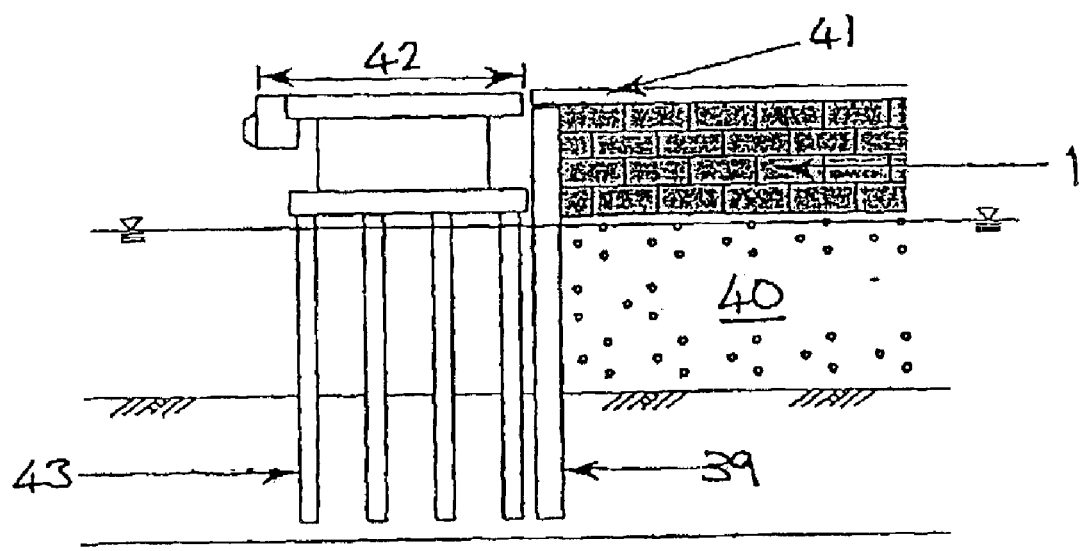

FIG. 14 shows a further possible use for rubberized construction blocks 1 in land reclamation. The rubberized construction blocks 1 are positioned flush with a retaining wall 39 on top of a sand fill 40. A pavement 41 is formed on top of the rubberized construction blocks 1 in line with a concrete deck 42, positioned on steel pipes 43, on the other side of retaining wall 39.

Thus, it will be appreciated that the superior engineering properties, including unit weight, compressive strength and drainage capability, of the rubberized construction material and blocks enable the construction industry to construct light earth-structures which reduce earth-pressures. Such structures are particularly useful on weak grounds.

The lightweight nature of the rubberized construction material and of the rubberized construction blocks also reduces, or even removes, the dependency on heavy machinery during the manufacturing and construction stages. Thus the rubberized construction material can reduce the noise and air pollution problems commonly encountered in conventional construction sites.

Furthermore, the rubberized construction material reduces total construction costs, construction time, transportation and haulage costs, and reduces fill requirements. The use of the rubberized construction material also facilitates land saving, free drainage which reduces or eliminates pore water pressure build-up, and provides good maintenance.

In summary, a new lightweight and porous construction material is created, the material mainly comprises of rubber crumbs/chips, cementitious materials such as Portland, hydraulic and/or slag cement, fly ash or pulverized fly ash (PFA), binding compound such as rubber powder, polymer fibers (filaments), aqueous rubber latex, polyurethane, rubber solution (prepared by dissolving vulcanized rubber in a chlorine-substituted hydrocarbon solvent), and water. The rubber crumbs/chips are, typically, derived from scrap rubber tires with steel wires/belts removed. Alternatively, the rubber crumbs/chips can be generated from other means, such as recycled rubber crumbs derived from other rubber products. The rubber crumbs/chips are mixed with cementitious materials, rubber powder, and water to form slurry. The slurry can be placed as cast-in-place lightweight and porous construction material. Alternatively, the material when still in slurry stage can be molded into lightweight construction blocks. The construction material/blocks can be applied to various civil and geotechnical works instead of conventional fill or backfill soils. The applicability of the construction material/blocks includes, but not limited to, the following earthworks: embankments, retaining structures, fill slopes, backfill underground works, road fills, highway pavement road-base or sub-base layer and land reclamation.

Although the description herein contains many specific embodiments and references, these are not intended to limit the scope of the invention but merely to provide illustrations of some of the presently preferred embodiments thereof. For example, the cementing mixture may contain other chemicals, admixtures and/or additives as commonly adopted in concrete technology to improve its engineering performance; or the construction blocks can have other shapes and configurations, or a portion of rubber bits are to be substituted by lightweight aggregate filler, such as sawdust, polystyrene pellets, cellulose fiber, expanded and dehydrated clay pellets, dehydrated and cemented bio-mass, furnace bottom ash and pellets, etc. Alternatively, a portion of the rubber bits can be substituted by aggregates such as sand and/or gravel or the like.

What is claimed is:

1. A method of manufacturing a construction material, said method comprising:

mixing a cementitious material, uniformly graded rubber bits having a coefficient of uniformity $C_u$ of less than 6 or gap graded rubber bits having an aggregate distribution coefficient of curvature $C_c$ outside the range of 1.5 to 2.5 and water to form a slurry in which the rubber bits are coated with cementitious material;

curing said slurry to form a porous matrix material with interconnected pore spaces that allow free drainage through the material, wherein the rubber bits are bonded together by the cementitious material.

2. The method of claim 1, wherein said bits are granules.

3. The method of claim 1, wherein said step of mixing comprises:

combining one part of the cementitious material with from 0.7 to 2.5 parts, inclusive, of rubber bits, said proportions determined by weight.

4. The method of claim 1, wherein the step of mixing comprises:

combining one part of the cementitious material with from 0.3 to 0.8 parts, inclusive, of water, said proportions determined by weight.

5. The method of claim 1, wherein the step of mixing comprises:

adding a binding compound for improving the strain compatibility of the construction material.

6. The method of claim 5, wherein the binding compound comprises rubber powder.

7. The method of claim 5, wherein the binding compound comprises a polymer fiber.

8. The method of claim 5, wherein the binding compound comprises an aqueous rubber latex.

9. The method of claim 5, wherein the binding compound comprises an aqueous polyurethane.

10. The method of claim 5, wherein the binding compound comprises a rubber solution prepared by dissolving vulcanized rubber in a chlorine-substituted hydrocarbon solvent.

11. The method of claim 5, wherein the step of mixing comprises:

combining one part of the cementitious material with from 0 to 2 parts of the binding compound, said proportions determined by volume.

12. The method of claim 1, wherein the rubber bits are derived from sources selected from the group consisting of: scrap rubber, vulcanized rubber, synthetic rubber, and fresh natural rubber.

13. The method of claim 1 wherein the cementitious material comprises a material selected from the group consisting of: Portland cement, hydraulic cement, slag cement, fly ash and pulverized fly ash.

14. The method of claim 1, wherein up to 90% of the rubber bits by weight are replaced with uniformly graded aggregates of sand and/or gravel having a coefficient of uniformity $C_u$ of less than 6 or gap graded aggregates of sand and/or gravel having an aggregate distribution with a coefficient of curvature $C_c$ outside the range of 1.5 to 2.5.

15. The method of claim 1, wherein up to 90% of the rubber bits by weight are replaced with lightweight aggregate fillers selected from the group consisting of: sawdust, polystyrene pellets, cellulose fiber, expanded and dehydrated clay pellets, dehydrated and cemented bio-solid pellets, furnace bottom ash and furnace bottom ash pellets, the lightweight aggregate being either uniformly graded with a coefficient of uniformity $C_u$ of less than 6 or gap graded with an aggregate distribution coefficient of curvature $C_c$ outside the range of 1.5 to 2.5.

16. The method of claim 1, further comprising the step of:

casting said slurry in place on a construction site; and said curing step comprises allowing said slurry to cure in place.

17. The method of claim 1, further comprising the step of:

casting said slurry in block forming molds.

18. The method of claim 16, wherein said step of casting comprises:

controlling the density and porosity of the slurry by vibration during placement of the slurry to a void ratio e in the range of 0.05 to 2.0.

19. The method of claim 17, wherein said step of casting comprises:

controlling the density and porosity of the slurry by vibration and static compression to a void ratio e in the range of 0.05 to 2.0.

20. A construction material comprising:

cured Portland cement based cementitious material and rubber bits, wherein the rubber bits are either uniformly graded with a coefficient of uniformity $C_u$ of less than 6 or gap graded with an aggregate distribution coefficient of curvature $C_c$ outside the range of 1.5 to 2.5 and the rubber bits are bonded together in a porous matrix having interconnected pore spaces by the cementitious material to allow free drainage.

21. The construction material of claim 20, wherein said construction material has a coefficient of permeability in the range of $10^1$ to $10^{-4}$ cm/sec.

22. The construction material of claim 20, wherein said construction material further comprises a binding material selected from the group consisting of: rubber powder, aqueous latex, aqueous polyurethane, polymer fibers, and rubber solution prepared by dissolving vulcanized rubber in a chlorine-substituted hydrocarbon solvent.

23. A method of manufacturing a construction material, said method comprising:

mixing a cementitious material, uniformly graded rubber bits having a coefficient of uniformity $C_u$ of less than 6 or gap graded rubber bits having an aggregate distribution coefficient of curvature $C_c$ outside the range of 1.5 to 2.5 and water to form a slurry in which the rubber bits are coated with cementitious material;

determining a slope of a compression curve $C_{rs}$ of the slurry;

employing the slope of the compression curve $C_{rs}$ to calculate an energy $\Delta E$ to be applied to the slurry to produce a construction material having a predetermined void ratio e;

applying the calculated quantity of energy $\Delta E$ to the slurry in the form of vibration and/or static compression; and allowing the slurry to cure;

wherein the cured construction material has an interconnected pore structure allowing free drainage through the material.

* * * * *